United States Patent

[11] 3,586,968

[72] Inventors Michel Francois Barjot Paris; Andre Edouard Joseph Cahtelon, Montrouge; Pierre Girard, Paris, all of, France

[21] Appl. No. 804,876

[22] Filed Mar. 6, 1969

[45] Patented June 22, 1971

[73] Assignee International Standard Electric Corporation New York, N.Y.

[32] Priority Mar. 8, 1968

[33] France

[31] 142,899

[54] FAULT LOCATING SYSTEM FOR A TRANSMISSION LINE HAVING A PLURALITY OF REPEATERS INCLUDING A DETECTOR COUPLED TO THE OUTPUT OF EACH REPEATER

10 Claims, 13 Drawing Figs.

[52] U.S. Cl. .......... 324/52, 179/175.31

[51] Int. Cl. .......... G01r 31/08, H04b 3/46

[50] Field of Search .......... 324/52; 179/175.25, 175.3, 175.31

[56] References Cited

UNITED STATES PATENTS

| | | | |
|---|---|---|---|
| 2,315,434 | 3/1943 | Leibe .......... | 179/175.31 |
| 2,838,604 | 6/1958 | Hoth .......... | 324/52 X |

*Primary Examiner*—Gerard R. Strecker

*Attorneys*—C. Cornell Remsen, Jr., Walter J. Baum, Percy P. Lantzy, Philip M. Bolton, Isidore Togut and Charles L. Johnson, Jr.

ABSTRACT: In a PCM communication system including a transmission line having a plurality of repeaters therealong, one at the end of each section of the line, a fault is located as follows. A repetitive code having a fundamental frequency F is propagated over the line from a transmitting station. A different detector responsive to frequency F is coupled to the output of each repeater. Each of the detectors is coupled to a different pulse generator. The pulse generators, before a fault responds to the detected frequency F to generate rectangular pulses having a given amplitude and a frequency F. These pulses are coupled to a supervisory transmission line without repeaters. At the receiving station measuring equipment detects the amplitude of the rectangular pulses on the supervisory line. The detected amplitude locates the fault. Where the communication system includes a plurality of main transmission lines, each pulse generator is common to the repeaters of a corresponding section of each of the main lines.

Inventors
MICHEL F. BARJOT
ANDRÉ E. J. CHATELON
By PIERRE GIRARD
Alfred C. Hill
Agent Inventors
MICHEL F. BARJOT
ANDRÉ E. J. CHATELON
By PIERRE GIRARD
Alfred C. Hill
Agent Inventors
MICHEL F. BARJOT
ANDRÉ E. J. CHATELON
By PIERRE GIRARD
Alfred C. Hill
Agent

FAULT LOCATING SYSTEM FOR A TRANSMISSION LINE HAVING A PLURALITY OF REPEATERS INCLUDING A DETECTOR COUPLED TO THE OUTPUT OF EACH REPEATER

BACKGROUND OF THE INVENTION

The present invention relates to pulse code modulation (PCM) communication systems and more particularly to a system to locate a fault therein.

The problem of the remote supervision of a transmission line, for instance, cable communication system is well known, and in order to solve it, it is necessary to provide a fault detection and locating system. This type of supervisory system is particularly useful in the case of a PCM cable communication system. In effect, the pulses obtained by PCM are applied, for instance, to a telephone cable, at high rates, in the order of megabits per second, so that the pulses are submitted to high attenuation in the course of their transmission. Therefore, it is necessary to regenerate these pulses in repeaters which are close to one another and are, thus, numerous for a given distance. The probability of failure of such a communication system comprising a large number of repeaters and an identical number of cable sections is not negligible and provisions must be made for a fault locating system which requires the addition of supplementary circuits. It is realized, however, that the fault locating system must be achieved in such a way that the supplementary circuits do not reduce the reliability of the communication system.

SUMMARY OF THE INVENTION

The object of the present invention is to add to a PCM communication system comprising a certain number of repeaters, a fault locating system which does not affect the reliability of the communication system.

According to one feature of the present invention there is provided a fault locating system for a PCM communication system comprising at least a first transmission line having a plurality of sections to propagate PCM signals; a plurality of repeaters each being coupled in the first line at the end of a different one of the sections of the first line; first means coupled to the input of the first line to propagate a predetermined repetitive code having a given fundamental frequency; a plurality of second means each being coupled to a different one of the repeaters to detect the given frequency passed through the associated one of the repeaters; a plurality of third means each being coupled to a different one of the second means responsive to the detected given frequency to produce a rectangular pulse having a frequency equal to the given frequency and a given amplitude; a second transmission line having only a plurality of cascade connected sections, each of the sections of the second line being equal in length to the sections of the first line and having a known attenuation for the given frequency, the input of each of the sections of the second line being coupled to a different one of the third means; and fourth means coupled to the output of the second line to measure the amplitude of the pulse, the amplitude of the pulse, the amplitude of the pulse identifying the location of the fault.

Another feature of the present invention is to provide a plurality of the first transmission lines with their associated repeaters and second means as defined above with each of the third means being coupled in common to the second means associated with the corresponding one of the sections of each of the first lines (sections of each of the first line of the same rank).

Still another feature of the present invention is to provide a direct current operating potential for each of the third means by coupling a direct current source to the second line and providing zener diodes in the second line coupled to each of the third means to supply the operating potential therefore.

A further feature of the present invention is to provide a fourth means having a third transmission line identical to the second line coupled to the output of the second line, through an amplifier if necessary, so that the amplitude measurement can be made at the end thereof associated with the propagation of the code into the first line, that is, at the transmitting terminal or station.

BRIEF DESCRIPTION OF THE DRAWING

The above-mentioned and other features and objects of this invention will become apparent by reference to the following description taken in conjunction with the accompanying drawings, in which.

FIGS. *4a* to *4h* represent diagrams of signals obtained at different points of the circuit of FIG. 3.

DESCRIPTION OF THE PREFERRED EMBODIMENT

Figure 1:
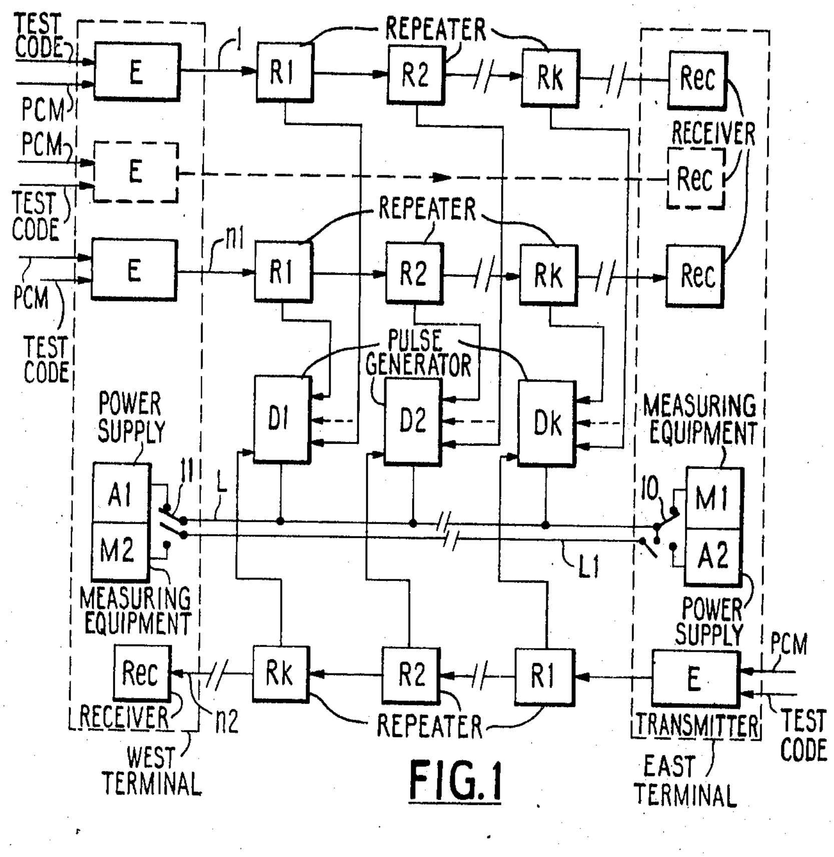
FIG. 1 is a block diagram of the fault locating system in accordance with the principles of this invention; FIGS. *2a* and *2b* illustrate vector diagrams useful in demonstrating the amplitude ranges of the signal received on the supervisory line.

FIG. 1 illustrates a PCM communication system. This system comprises a certain number N of transmission lines, each line being assigned to the transmission of a certain number of channels, this number of channels being generally 24. Physically, each line is constituted by two conductors forming a pair. In fact, the number of lines, or pairs of conductors, actually used in a cable is lower than the maximum number in the cable in order to enable the traffic to flow by reserve lines when certain of the main lines in operation present faults. It will be observed that on a transmission cable, provision may be made for voice transmission lines and transmission lines operating according to the PCM process.

It will be assumed that the transmission cable comprises *n*1 lines carrying out the transmission between the terminal stations reference "West" and "East" in one direction, for instance, the direction West-East, and *n*2 lines carrying out the transmission in the opposite direction, i.e. the direction East-West. In FIG. 1, only the two West-East lines 1 and *n*1, as well as the East-West line *n*2 have been illustrated. Each one of these lines comprises, on the transmission side, transmitter E and on the receiving side receiver R*ec*. Repeaters R are arranged at regular intervals on each line in order to be able to amplify the signal which has been attenuated by each section. The receiver R*ec* comprises mainly a repeater which will be designated by R*n*. It is clear that on a transmission cable the repeaters of same rank of all the lines (repeaters for corresponding sections of all the lines) are in fact grouped at the same point along the cable.

According to the present invention, it is intended to assign a reserve line for locating a fault which may be present in each PCM line, whatever the direction of transmission of the PCM. This supervisory line L is connected at each one of its ends, either to measuring equipment M, or to power supply A according to the direction of transmission considered. Thus, if the PCM line considered carries out a transmission West-East, supervisory line L is connected at the West end to power supply A1 and at the East end to measuring equipment M1. Reversely, if the PCM line considered carries out a transmission East-West, supervisory line L is connected to the East end to power supply A2 and at the West end to measuring equipment M2. The connection either to the one or the to the other of these circuits is obtained by means of switches 10 and 11. It will be observed that the power supply may also be on the same side as the measuring equipment. At each section, line L is connected to the various repeaters, R1, R2...R*k*...R*n* through pulse generator D which will be described in detail in relation with FIG. 3. In FIG. 1, only generators D1, D2, D*k* associated, respectively, to repeaters R1, R2, R*k*, have been illustrated.

The principle of locating a fault is the following. A certain test code, compatible with the repeaters and having a known fundamental frequency component F, is sent on the faulty transmission line. In each repeater located before the faulty point, the signal corresponding to this fundamental component is detected and transformed, in generator D, into rectangular pulses having an amplitude M and a fundamental frequency F which are applied to line L. The pulses coming from generators D associated with the repeaters located before the faulty point give rise to a signal, the level of the fundamental component F of which, is detected at the end of line L. The attenuation of the fundamental component F for each section of line L, as well as the maximum phase angle due to the times of propagation in the faulty line and in the line L are known. Having this information it is possible to determine from the various ranges of the amplitude of the fundamental component F of the output signal on line L the position of the faulty point of repeater.

In order to clarify ideas, it will be assumed that each transmission line comprises *n* sections, and thus *n* repeaters, taking into account repeater R*n* of receiver Rec. These repeater will be reference R1 to R*n*, and it will be assumed that the faulty point is located after repeater R*k*. Table I indicates the different possible paths of the supervisory signals (the test code and the pulses of amplitude M and frequency F).

TABLE I

| Signal flowing by— | Number of main line sections | Number of repeaters | Number of generators D | Number of supervisory line sections | Total number of sections |
|---|---|---|---|---|---|
| D1 | 1 | 1 | 1 | $n-1$ | $n$ |
| D2 | 2 | 2 | 1 | $n-2$ | $n$ |
| D$k-3$ | $k-3$ | $k-3$ | 1 | $n-(k-3)$ | $n$ |
| D$k-2$ | $k-2$ | $k-2$ | 1 | $n-(k-2)$ | $n$ |
| D$k-1$ | $k-1$ | $k-1$ | 1 | $n-(k-1)$ | $n$ |
| D$k$ | $k$ | $k$ | 1 | $n-k$ | $n$ |

TABLE I shows that for two different paths the supervisory signals propagate over the same number of sections and one generator D, while the number of repeaters crossed vary form one path to the other. Therefore, the difference is the time of propagation between two consecutive paths depends only upon the delay due to the additional repeater and to the difference in the time of propagation between the pairs of one same section. At the frequency of the fundamental component, this total difference of the time of propagation corresponds to a phase angle *a*.

In order to simplify the calculation, it will be assumed that the attenuation to which the fundamental component F is submitted for each section is equal to two. Thus, if U is the amplitude of the fundamental frequency component F of the pulses transmitted by generator D1, the amplitude of said component at the input of measuring equipment M1, will be $U/2^{n-1}=v$. At the input of equipment M1, the amplitude of component F coming from generator D2 will be $U/2^{n-2}=2v$. These different pulses at the same fundamental frequency F transmitted by generators D1, D2...D*k* may be shown, respectively, by vectors V1, V2...V*k* of, respective, amplitudes $v$, $2v$...$2^{k-1}v$. The amplitude of the input signal of frequency F to equipment M1, for a fault located between repeaters *Rk* and *Rk*+1, is given by the sum vector of the various vectors V1 to V*k*, said vectors being expressed by their amplitude and their phase. This sum is maximum when all the vectors are in phase and is given by $$S\max=v\sum_{m=0}^{k-1}2^m=(2^k-1)v.$$

Figure 2A:
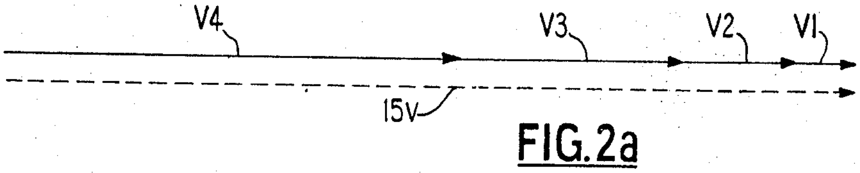

FIG. 2*a* shows this sum vector when $k=4$ and, thus, Smax = 15*v*. This sum is minimum when all the vectors are affected by the maximum phase angle *a* and is given by $$S\min=v\sum_{m=0}^{k-1}2^m\cos^{k-m-1}a=2^{k-1}v\frac{1-\left(\frac{\cos a}{2}\right)^k}{1-\frac{\cos a}{2}}$$

Figure 2B:
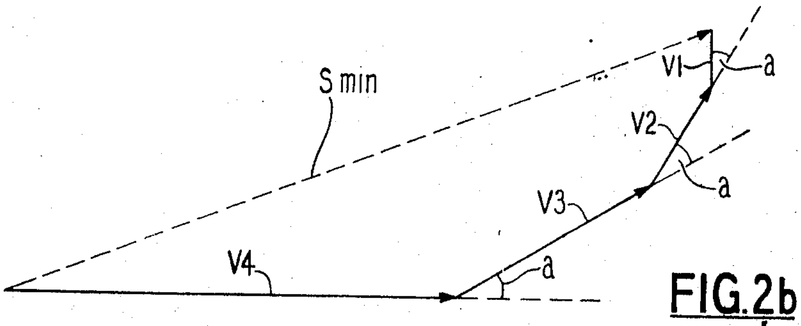

FIG. 2*b* represents this sum vector when $k=4$ and $a=30°$. With these values, Smin is equal to 13.65*v*.

In order that the fault can be located accurately, it is necessary for the signal obtained for a fault located between repeaters R*k*−1 and R*k* (section *k*) cannot be taken for a signal obtained for a fault located between the repeaters R*k* and R*k*+1 (section *k*+1), i.e., that the possible values of the signals for each section are within ranges which do not overlap. Thus, the maximum signal for the section *k*, said said signal will be called Smax (*k*), must always be lower than the minimum signal for the section *k*+1, said signal being called Smin (*k*+1). It is easy to see that, for a given value of *a*, the ratio between Smin (*k*+1)/Smax (*k*) is smaller as the number *k* is bigger, and it may be demonstrated that this ratio tends towards a limit given by $$\frac{1}{1-\frac{\cos a}{2}}$$

when *k* tends towards infinity. When $a=30°$, this limit is 1.76.

In order to be able to locate the position of the faulty point, it is sufficient to know the measured signal and to compare its value against the maximum values of the signals for the various sections. The rank of the faulty section will be that for which the signal measured is lower than the maximum signal of said section while being higher than the maximum signal of the section of immediately lower rank. Table II gives rank of the faulty section in relation with the signal S measured by taking a transmission line comprising $n=10$ sections.

TABLE II

| Section rank: | Measurement range |
|---|---|
| 1 | S=0 |
| 2 | $0<S\leq v$ |
| 3 | $v<S\leq 3v$ |
| 4 | $3v<S\leq 7v$ |
| 5 | $7v<S\leq 15v$ |
| 6 | $15v<S\leq 31v$ |
| 7 | $31v<S\leq 63v$ |
| 8 | $63v<S\leq 127v$ |
| 9 | $127v<S\leq 255v$ |
| 10 | $255v<S\leq 511v$ |

The amplitude U of the fundamental component of the pulses transmitted by generators D must be such that the measured signal coming from generator D1 alone may be distinguished form the noise signal. This noise signal comes form the crosstalk voltage collected on line L, said voltage being due to the level of the fundamental component F in each transmission line. This crosstalk voltage E*d* is given by the formula $$Ed=\sqrt{(p-1)\left(\frac{e}{f}\right)^2}$$

where *p* designates the number of disturbance pairs, *f* the crosstalk ratio between two pairs of the cable, and *e* the level of the component at the frequency F contained in a random code at the output of a repeater. E*d* being thus determined, the amplitude U is given by the formula $20\log U/Ed\geq nb+c$, where *b* designates the attenuation in decibels contributed by each section, and *c* designates the crosstalk protection at the frequency F which is imposed in order to be able to detect the signal in the crosstalk noise. It is clear that the value of U enables the determination of the form factor or duty cycle and the amplitude M of the pulses transmitted from each generator D.

Figure 3:
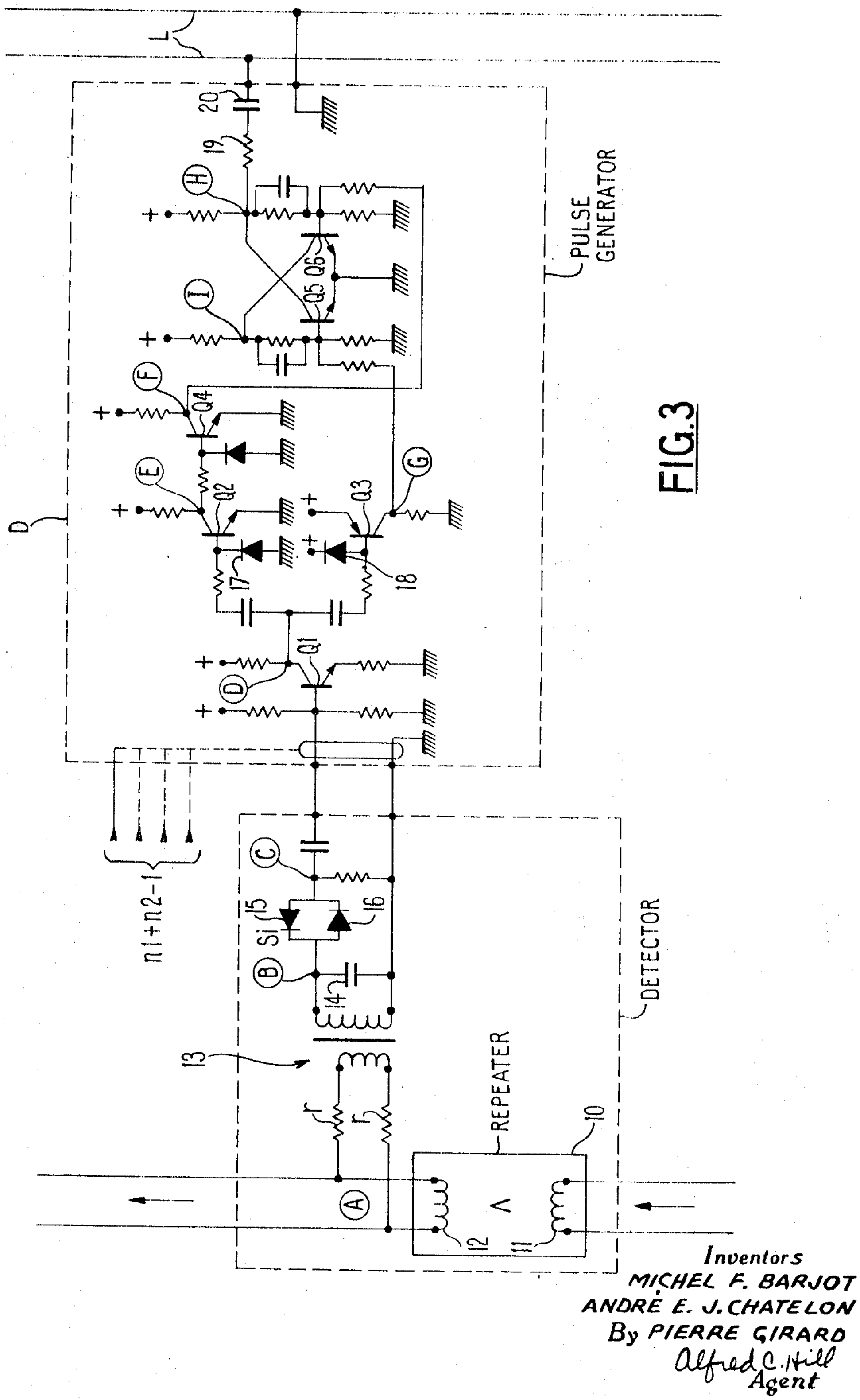
FIG. 3 is a schematic diagram of the detector coupled to the repeaters and the pulse generator coupled to the detectors of the repeaters of same rank of FIG. 1.
Figures 4A, 4B, 4C, 4D, 4E, 4F, 4G, 4H:
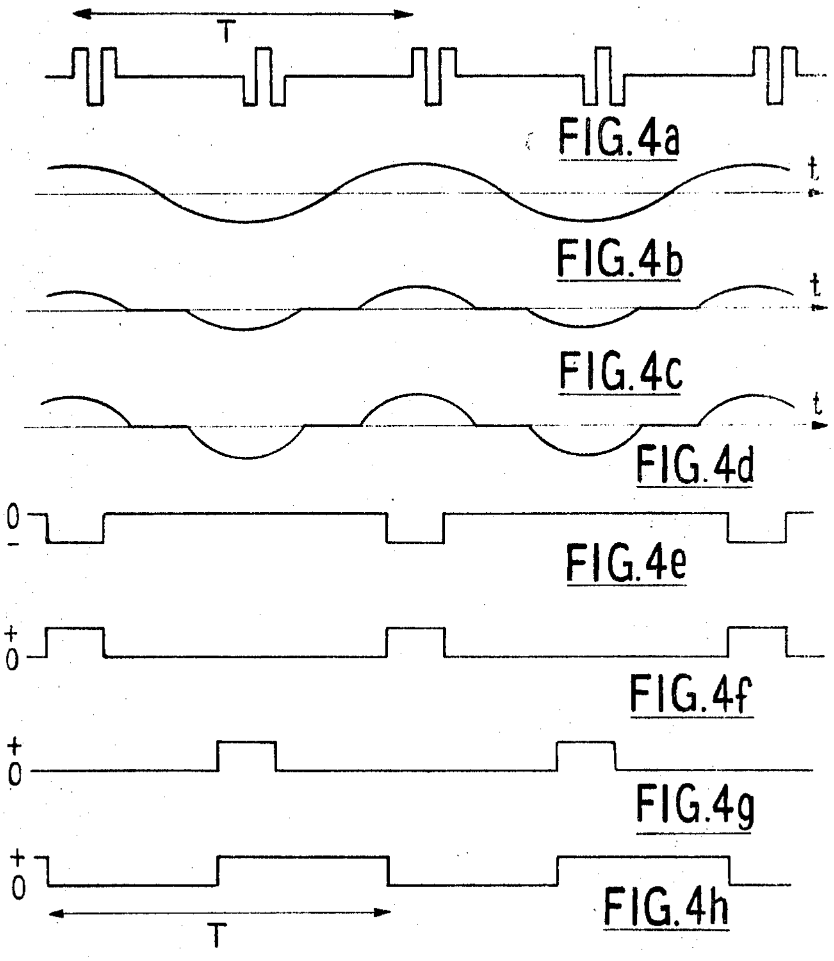

FIG. 3 illustrates a detailed schematic diagram of generator D common to all the repeaters of same rank and of the detection circuit for the fundamental component F associated with each repeater. The conventional part of the repeaters has be shown by a rectangle 10 inside which the windings 11 and 12 represent, respectively, the input and output transformers of the repeater. The detection circuit is arranged at the output of the repeater and is constituted by transformer 13 the secondary winding of which is tuned to the frequency F by capacitor 14. A threshold circuit constituted by silicon diodes 15 and 16 enables to take into account only the signal above a certain value, i.e., the signal corresponding to the test code. FIGS. 4*a* to 4*h* illustrates the waveform of the signals at different points A to H of FIG. 3. At point A, at the output of the repeater, the signal is constituted by the test code which is repeated at regular intervals. In the particular example described, this code comprises three "1's" transmitted in the form of a bipolar signal, said code being repeated at the frequency $2F=96.50$ kilohertz. Owing to the utilization of a bipolar signal, the fundamental frequency of the signal of FIG. 4*a* is $F=1/l$. This frequency F has been chosen in such a way that it corresponds to a two to one attenuation ratio per section. Also, the repetitive code chosen gives the maximum value for the component at frequency F. The signal at point B (FIG. 4*b*) is a sinusoidal signal at frequency F, the amplitude of which is proportional to the level of the component at frequency F of the signal actually transmitted by the transmission line. At point C, the output of the threshold circuit, the signal has the shape given by FIG. 4*c*. Thus, it is certain that this signal can only be due to the test code. This signal is amplified by the NPN transistor Q1 which operates in class A, said amplified signal being applied simultaneously to two transistors Q2 and Q3. The NPN transistor Q2, normally blocked by diode 17 in the absence of signal, or for a negative signal, is saturated by a fraction of the position swing of the signal of FIG. 4*d*. The NPN transistor Q3, normally blocked by diode 18 in the absence of signal, or for a positive signal, is saturated by a fraction of the negative swing of the signal of FIG. 4*d*. The diagrams of signals at the points E and G of the collector of transistors Q2 and Q3 are illustrated, respectively, by FIGS. 4*e* and 4*f*. The signals supplied by transistor Q3 are applied at the base of transistor Q5 which, with the transistor Q6, constitutes a bistable circuit. This bistable circuit resets, for instance, to the "0" state for each positive leading edge of the signal of FIG. 4*f* and sets to the "1" state for each positive leading edge of the signal of FIG. 4*g*, this last signal having been obtained by inverting the signal of transistor Q2 by the NPN transistor Q4. The output signal of the bistable circuit is taken form the collector of transistor Q5 and is applied to the supervisory pair L through resistor 19 and capacitor 20. This output signal represented in FIG. 4*h* is constituted by a series of rectangular pulses having a period $T=1/F$ and a duty cycle of 1/2. The value of resistor 19 will be chosen in such a way that the amplitude of the rectangular pulses at the input of line L is equal to M.

Generator D which comprises transistors Q1 to Q6 is common to all the repeaters of same rank whatever the direction of the transmission may be. Generator D is, thus, connected as sown on FIG. 3 to the $(n1+n2)$ repeaters of same rank, each repeater including a detection circuit such as the one described previously.

Figure 5:
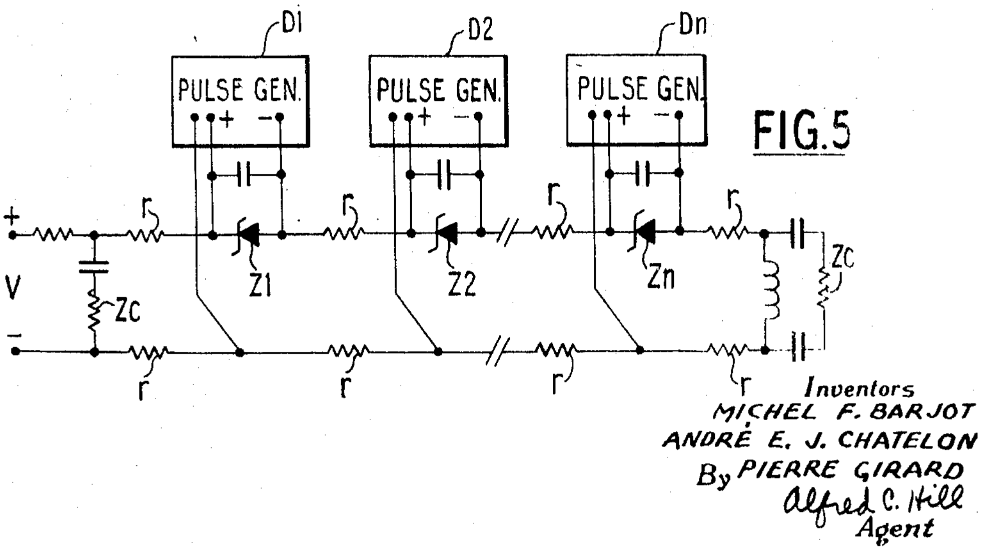
FIG. 5 is a schematic diagram illustrating how the direction current operating potential is derived from the supervisory line for each of the pulse generators D of FIG. 1.

FIG. 5 represents a particular example of supplying direct current operating potentials to the generators D referenced D1, D2...D*n*, the circuit D*n* being associated with the repeater R*n* of receiver R*ec*. This operating potential is supplied though supervisory line L by applying through either switches 10 or 11 from power supplies A1 or A2 a sufficient known voltage V at one of its ends. The voltage required for the operation of each generator D is picked up through a zener diode (referenced Z1 to Z*n*). The resistors *r* represent the resistances of the sections and the resistor Z*c* represents the characteristic impedance. It is clear that the detection of the measurement signal and the application of the supply voltage V may be made either at different ends or at the same end of line L. It is also possible to supply the operating potential to generators D form the power supply of the repeaters. However, the solution described in relation to FIG. 5 presents the advantage that the time of consumption of electricity is limited to the duration of the measurements.

The locating of a fault on a transmission line requires two operators, one operator at each end, the two operators being connected by a telephone link constituted by the service link. The operator at the transmission station connects successively a test code generator on each transmission line, and for each line the operator at the receiving station measures the level of the fundamental component and compares it to the various values of Table II for locating the point of the fault. For the opposite direction of transmission, the roles of the operators are reversed.

This number of operators may be reduced to one, if a second supervisory transmission line L1 is provided, the purpose of which is to transmit to the transmission terminal the signal received on the first supervisory line at the receiving station, the said signal having been, if necessary, amplified before being applied to this second supervisory line.

While I have described above the principles of my invention in connection with specific apparatus, it is to be clearly understood that this description is made by way of example and not as a limitation of the scope of may invention as set forth in the objects thereof and in the accompanying claims.

We claim:

1. A fault locating system for a pulse code modulation communication system comprising:
   at least a first transmission line having a plurality of sections to propagate pulse code modulation signals;
   a plurality of repeaters each being coupled in said first line at the end of a different one of said sections of said first line;
   first means coupled to the input of said first line to propagate a predetermined repetitive code having a given fundamental frequency;
   a plurality of second means each being coupled to a different one of said repeaters to detect said given frequency passed through the associated one of said repeaters;
   a plurality of third means each being coupled to a different one of said second means responsive to said detected given frequency to produce a rectangular pulse having a frequency equal to said given frequency and a given amplitude;
   a second transmission line having only a plurality of cascade connected sections, each of said sections of said second line being equal in length to said sections of said first line and having a known attenuation for said given frequency the input of each of said sections of said second line being coupled to a different one of said third means; and
   fourth means coupled to the output of said second line to measure the amplitude of said pulse, the amplitude of said pulse identifying the location of said faulty one of said repeaters.
2. A locating system according to claim 1, further including fifth means coupled to said second line to provide a direct current operating potential for each of said third means.
3. A locating system according to claim 2, wherein said fifth means includes
   a direct current power supply source coupled to one end of said second line, and
   a plurality of zener diodes inserted in said second line, each of said zener diodes being coupled to a different one of said third means to provide said operating potential therefore.
4. A locating system according to claim 1, wherein said fourth means includes
   a third transmission line identical to said second line, the input of said third line being coupled to the output of said second line, and
   amplitude measuring means coupled to the output of said third line to enable identifying the location of a faulty one of said repeaters.
5. A locating system according to claim 1, further including a first terminal coupled to the input of said first and a second lines; and a second terminal coupled to the output of said first and second lines; and wherein said first means is disposed in said first terminal; and said fourth means is disposed in said second terminal.

6. A locating system according to claim 5, further including a direct current power supply source disposed in one of said first and second terminals and coupled to the associated one of said input and said output of said second line, and a plurality of zener diodes inserted in said second line, each of said zener diodes being coupled to a different one of said third means to provide a direct current operating potential therefore.

7. A locating system according to claim 1, further including a first terminal coupled to the input of said first and second lines; and a second terminal coupled to the output of said first and second lines; and wherein said first means is disposed in said first terminal; and said fourth means includes a third transmission line identical to said second line, the input of said third line being coupled to the output of said second line in said second terminal, and amplitude measuring means disposed in said first terminal coupled to the output of said third line to enable identifying the location of a faulty one of said repeaters.

8. A locating system according to claim 1, further including a plurality of said first lines; and wherein said repeaters are increased in number to provide a different one of said repeaters coupled to the end of a different one of said sections of each of said first lines;

said first means is increased in number to propagate said code through each of said first lines;

said second means are increased to accommodate the increase of said repeaters; and each of said third means are coupled in common to said second means associated with the corresponding one of said sections of each of said first lines.

9. A locating system according to claim 8, wherein said pulse code modulation signals are propagated in one direction on certain ones of said first lines, and said pulse code modulation signals are porpagaged in the other direction on others of said first lines.

10. A locating system according to claim 9, wherein said code is propagated on said certain ones of said first lines in said one direction, and said code is propagated on said others of said first line in said other direction.